(12) United States Patent
Kinlen et al.

(10) Patent No.: US 11,059,594 B2
(45) Date of Patent: Jul. 13, 2021

(54) INTEGRATED LIGHTNING PROTECTION AND ELECTRICAL DE-ICING FOR AERODYNAMIC STRUCTURES

(71) Applicant: The Boeing Company, Chicago, IL (US)

(72) Inventors: Patrick J. Kinlen, Fenton, MO (US); Eric A. Bruton, St. Louis, MO (US); Edward W. Brouwers, Havertown, PA (US); Kenneth W. Young, Bear, DE (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/855,072

(22) Filed: Apr. 22, 2020

(65) Prior Publication Data

US 2020/0247550 A1 Aug. 6, 2020

Related U.S. Application Data

(63) Continuation of application No. 15/851,041, filed on Dec. 21, 2017, now Pat. No. 10,669,033.

(51) Int. Cl.
*B64D 15/12* (2006.01)
*B32B 3/26* (2006.01)
(Continued)

(52) U.S. Cl.
CPC .............. *B64D 15/12* (2013.01); *B32B 3/266* (2013.01); *B64C 11/205* (2013.01); *B64D 15/20* (2013.01);
(Continued)

(58) Field of Classification Search
CPC .......... B64D 15/12; B64D 15/20; H05B 3/34; H05B 3/14; H05B 3/146; H05B 3/145;
(Continued)

(56) References Cited

U.S. PATENT DOCUMENTS

| 5,865,397 A | 2/1999 | Hermann |
| 2007/0230085 A1 | 10/2007 | Le |

(Continued)

FOREIGN PATENT DOCUMENTS

| EP | 1 715 160 | 10/2006 |
| WO | WO 2011/096851 | 8/2011 |

OTHER PUBLICATIONS

Extended European Search Report prepared by the European Patent Office in application No. EP 18 21 2657.3 dated Apr. 9, 2019.
(Continued)

*Primary Examiner* — Danny Nguyen
(74) *Attorney, Agent, or Firm* — McDonnell Boehnen Hulbert & Berghoff LLP

(57) ABSTRACT

An example method includes: forming a conductive layer on at least a portion of a surface of a substrate, where the substrate comprises a composite material of an aerodynamic structure, and where the conductive layer is configured to provide a conductive path to conduct an electric current generated by a lightning strike to an electrically-grounded location; depositing an insulating layer on the conductive layer; removing one or more portions of the insulating layer to form respective gaps in the insulating layer and expose corresponding one or more portions of the conductive layer; and forming a resistive-heater layer on the insulating layer such that the resistive-heater layer fills the respective gaps in the insulating layer and contacts the corresponding one or more portions of the conductive layer, such that when electric power is provided to the conductive layer, the electric power is communicated to the resistive-heater layer thereby generating heat therefrom.

20 Claims, 8 Drawing Sheets

(51) Int. Cl.
    *H05B 3/34*           (2006.01)
    *B64C 11/20*         (2006.01)
    *B64D 15/20*         (2006.01)
    *B64D 45/02*         (2006.01)
    *H05B 3/14*           (2006.01)

(52) U.S. Cl.
    CPC ............. *B64D 45/02* (2013.01); *H05B 3/141* (2013.01); *H05B 3/145* (2013.01); *H05B 3/146* (2013.01); *H05B 3/34* (2013.01); *H05B 2203/013* (2013.01); *H05B 2203/017* (2013.01); *H05B 2214/02* (2013.01)

(58) Field of Classification Search
    CPC .......... H05B 2203/017; H05B 2214/02; H05B 2203/013; H05B 3/141; B32B 3/26; B32B 3/266; B64C 11/20; B64C 11/205
    USPC ......................................................... 361/218
    See application file for complete search history.

(56) References Cited

U.S. PATENT DOCUMENTS

| | | | |
|---|---|---|---|
| 2013/0043342 A1* | 2/2013 | Nordin .................. | H05B 3/145 244/1 A |
| 2014/0014640 A1 | 1/2014 | Calder et al. | |
| 2019/0193862 A1 | 6/2019 | Kinlen et al. | |

OTHER PUBLICATIONS

Kwon, et al., "Electromagnetic Shielding Effectiveness of Grid-Mesh Films Made of Polyaniline: a Numerical Approach", CMC, vol. 21, No. 1, pp. 65-86, 2011.

* cited by examiner

FORMING AT LEAST ONE CONDUCTIVE POLYMER LAYER — 1224

FIG. 18

FORMING A MULTILAYER STACK COMPRISING A PLURALITY OF CONDUCTIVE POLYMER LAYERS, EACH CONDUCTIVE POLYMER LAYER BEING INTERPOSED BETWEEN RESPECTIVE INSULATING LAYERS, WHERE EACH CONDUCTIVE POLYMER LAYER HAS A RESPECTIVE ELECTRICAL RESISTANCE, SUCH THAT WHEN THE RESPECTIVE CONDUCTIVE POLYMER LAYERS ARE CONNECTED IN PARALLEL TO A POWER SOURCE OF THE ELECTRIC POWER, A RESULTANT ELECTRICAL RESISTANCE OF THE RESPECTIVE CONDUCTIVE POLYMER LAYERS IS LESS THAN EACH RESPECTIVE ELECTRICAL RESISTANCE — 1226

FIG. 19

INTEGRATED LIGHTNING PROTECTION AND ELECTRICAL DE-ICING FOR AERODYNAMIC STRUCTURES

CROSS REFERENCE TO RELATED APPLICATION

The present application is a continuation of U.S. patent application Ser. No. 15/851,041, filed on Dec. 21, 2017, and issued as U.S. Pat. No. 10,669,033, the entire contents of which are herein incorporated by reference as if fully set forth in this description.

FIELD

The present disclosure relates generally to an aircraft or rotorcraft system that provides anti-icing or de-icing. In further examples, methods and systems for integrating de-icing with a lightning protection system are provided.

BACKGROUND

Cold weather conditions promote buildup of ice on vehicle surfaces. To remove the ice, large amounts of chemicals are often sprayed onto the ice to promote melting. Additionally or alternatively, electrical heating of vehicle surfaces to melt the ice involves a large energy consumption to promote sufficient de-icing. The large amounts of chemicals and/or energy consumption are each a cost burden on a user of the vehicle.

De-icing is particularly challenging for wings and airfoils, such as rotor blades, of rotorcraft vehicles, such as helicopters. De-icing may be implemented to aircraft and rotorcraft via an electrothermal ice protection system.

The electrothermal ice protection system includes heaters installed within the composite structure of the blade. For de-icing processes, the goal of the heaters is to quickly elevate the temperature of the ice/rotor interface above 32° F. A temperature greater than 50° F. is usually sought. The heating process only melts the interface of the ice, allowing centrifugal force of rotating blades to remove the ice from the surface.

The heaters are installed within the blades of the rotorcraft as a separate system. The electrothermal ice protection system comprises a power generator to apply electrical energy to one or more components of the rotor blade. Depending on rotor blade structure, power densities of about 25 Watts per square inch (WSI) are generated to achieve the required surface temperatures with minimum power-on times. Such power densities place a large demand on the rotorcraft electrical system.

Further, the heaters installed deep within the composite structure of the blade. As a result, a large amount of energy is used so as to generate a sufficient amount of heat that reaches the surface of the blade and melt the ice. Further, the configuration of the heaters being disposed deep within the blade renders the heaters difficult to reach and perform repair or maintenance operations thereon.

Also, the heaters are installed within the spar during manufacturing of the blade. The blade spar manufacturing process exposes the de-icing heaters and components to an elevated cure temperature. Thus, to protect the de-icing heaters and components, the cure temperature may be limited to a low temperature (e.g. 250° F.) or the de-icing heaters and components are made of materials that can withstand high cure temperature, thereby complicating the manufacturing process or increase cost of the rotorcraft.

It is with respect to these and other considerations that the disclosure made herein is presented.

SUMMARY

The present disclosure describes examples that relate to integrated lightning protection and electrical de-icing for aircraft and rotorcraft structures.

In one aspect, the present disclosure describes a method. The method includes: (i) forming a conductive layer on at least a portion of a surface of a substrate, where the substrate comprises a composite material of an aerodynamic structure, and where the conductive layer is configured to provide a conductive path to conduct an electric current generated by a lightning strike to an electrically-grounded location; (ii) depositing an insulating layer on the conductive layer; (iii) removing one or more portions of the insulating layer to form respective gaps in the insulating layer and expose corresponding one or more portions of the conductive layer; and (iv) forming a resistive-heater layer on the insulating layer such that the resistive-heater layer fills the respective gaps in the insulating layer and contacts the corresponding one or more portions of the conductive layer, such that when electric power is provided to the conductive layer, the electric power is communicated to the resistive-heater layer thereby generating heat therefrom to de-ice the aerodynamic structure.

In another aspect, the present disclosure describes a device. The device includes: (i) a substrate comprising a composite material; (ii) a conductive layer formed on at least a portion of a surface of the substrate; (iii) an insulating layer deposited on the conductive layer, where the insulating layer includes at least one gap that exposes a portion of the conductive layer; and (iv) a resistive-heater layer formed on the insulating layer such that the resistive-heater layer fills the at least one gap in the insulating layer and contacts the portion of the conductive layer, such that when electric power is provided to the conductive layer, the electric power is communicated to the resistive-heater layer thereby generating heat therefrom.

In still another aspect, the present disclosure describes an aerodynamic structure. The aerodynamic structure includes: (i) a substrate comprising a composite material; (ii) a conductive layer formed on at least a portion of a surface of the substrate, where the conductive layer is configured to provide a conductive path to conduct an electric current generated by a lightning strike to an electrically-grounded location; (iii) an insulating layer deposited on the conductive layer, where the insulating layer includes at least one gap that exposes a portion of the conductive layer; and (iv) a resistive-heater layer formed on the insulating layer such that the resistive-heater layer fills the at least one gap in the insulating layer and contacts the portion of the conductive layer, such that when electric power is provided to the conductive layer, the electric power is communicated to the resistive-heater layer thereby generating heat therefrom.

The foregoing summary is illustrative only and is not intended to be in any way limiting. In addition to the illustrative aspects, examples, and features described above, further aspects, examples, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 18 is a flowchart of additional operations that may be performed with the method of FIG. 12, in accordance with an example implementation.

FIG. 19 is a flowchart of additional operations that may be performed with the method of FIG. 12, in accordance with an example implementation.

DETAILED DESCRIPTION

Figure 1:
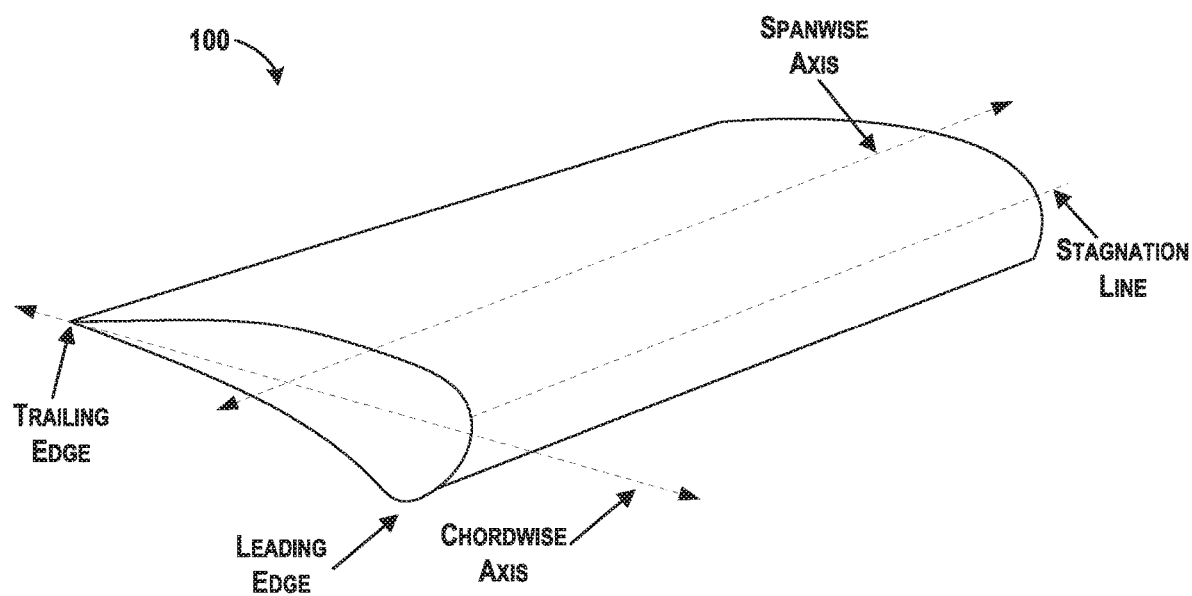
FIG. 1 illustrates an example aerodynamic structure in the form of a blade, in accordance with an example implementation.

Electrothermal de-icing systems include heaters or heating elements installed within aerodynamic structures of aircraft, rotorcraft, wind turbines etc. An example aerodynamic structure may include an "airfoil." An airfoil may be an aerodynamic structure having curved surfaces and used as the basic form of the wings, fins, blades, and horizontal stabilizer of most rotorcraft and aircraft, in addition to wind turbines and similar systems. In an example, an aerodynamic structure may comprise a substrate in the shape of a wing or a blade (e.g., of a propeller, rotor, wind turbine, etc.). In the description presented herein a blade of a rotorcraft is used as an example aerodynamic structure to illustrate the disclosed systems and methods. However, it should be understood that the systems and methods can be applied to any other component or aerodynamic structure of an aircraft, rotorcraft, a wind turbine, etc.

A blade of rotorcraft has an outer surface. The heaters of a de-icing system may be installed deep within (e.g., ⅓ of the way from the outer surface of) the blade and may form a separate system from other systems of the rotorcraft, thus adding to the cost of the aircraft. As a result of the heaters being away from the outer surface of the blade, a large amount of energy is used so as to generate a sufficient amount of heat that reaches the surface of the blade and melts the ice. Further, the configuration of the heaters being disposed deep within the blade renders the heaters difficult to reach and perform repair or maintenance operations thereon. As such, de-icing system components may render the overall blade de-ice system irreparable. As a result, repairing the de-icing system may typically involve installation of one or more new blades or not allowing the rotorcraft to fly in cold regions (i.e., move the rotorcraft operation to warmer climate where a de-icing system might not be needed).

Within examples described herein, the de-icing system is integrated with (e.g., have common components with) another system of the rotorcraft as opposed to being a separate system. In particular, the lightning strike protection system of the rotorcraft can include conductive elements disposed in the blade of the aircraft and configured to form a conductive path that electrically connects a portion of the rotorcraft where the lightning strike impacts the rotorcraft to another location of the rotorcraft where the electrical charge of the lightning strike is discharged. In other words, the electric current generated by the lightning strike could be guided by the conductive elements from one location of the aircraft where the lightning strike impacts the aircraft to another location to be discharged.

Disclosed herein are systems that utilize the conductive elements of the lightning strike protection system as conductors that facilitate providing electric energy to the heaters of the de-icing system. This way, the de-icing system is integrated with the lightning strike protection system with both system using common parts, thereby reducing the overall cost of the rotorcraft. Further, using the conductive elements of the lightning strike enables the heaters of the de-icing system to be disposed near or at the outer surface of the blade (e.g., between 0.1 millimeter and 2.5 millimeter from the outer surface). With this configuration, the amount of electric energy used to generate sufficient heat to melt the ice is reduced compared to other systems where the heaters are disposed deep within the blade. Moreover, due to the heaters being disposed near or at the outer surfaces of the blade, the heaters are accessible, and performing maintenance and repair operations is enabled.

FIG. 1 illustrates an example aerodynamic structure in the form of a blade 100, in accordance with an example implementation. The spanwise and chordwise axes are illustrated, and a leading edge is on a side on a stagnation line, while a trailing edge is opposite the leading edge. The blade 100 can be configured as a composite structure made of a composite material such as carbon fiber or fiberglass, among other possible composite materials.

General aviation aircraft, rotorcraft, large commercial jets, and wind turbines are vulnerable to lightning strike. Unlike their metal counterparts, composite structures in these applications might not readily conduct away the extreme electrical currents and electromagnetic forces generated by lightning strikes. Composite materials are either not conductive (e.g., fiberglass) or are significantly less conductive than metals (e.g., carbon fiber).

If a lightning bolt strikes an unprotected structure, up to 200,000 amperes of electric current seeks the path of least resistance. An electric current of such magnitude may vaporize metal control cables, weld hinges on control surfaces, vaporize resin in the immediate strike area, among other effects. Further, the lightning strike may cause magnetic fields and electrical potential differences in the structure thus inducing transient voltages, which can affect unshielded electronics. To protect the rotorcraft from such effects, a lightning strike protection system can be coupled to different components of the rotorcraft such as the blade 100.

A lightning strike protection system can include a conductive layer disposed in the blade 100 to provide an adequate conductive path so that an electric current generated by a lightning strike remains at or near a surface of the blade 100. The lightning protection system may further be configured to eliminate gaps in the conductive path to prevent arcing at attachment points, and protect wiring, cables and sensitive equipment from surges or transients through careful grounding. Conductive paths in the composite structure of the blade 100 can be established by bonding a metallic (e.g., aluminum) foil to the composite structure of the blade 100. For instance, an expanded foil can be deposited on and cocured with an exterior ply of the composite material forming the blade 100. In an example, aluminum expanded foil can be coupled (e.g., adhered) to the composite material of the blade 100, where the composite material is configured as a substrate for the aluminum expanded foil. In another example, a thin metal mesh or foil may be deposited, formed, or coupled to the outer layers of the composite structure of the blade 100.

The conductive layer (e.g., the expanded foil) can be coupled to electrodes disposed at sharp edges of the rotorcraft (e.g., tip of the blade 100) where the lightning strike is most likely to impact the rotorcraft. The conductive layer is also electrically connected to the rest of the rotorcraft in order to give the electric current generated by the lightning strike an ample number of routes to safely exit the rotorcraft (e.g., discharged away from the rotorcraft through wicks electrically connected to the conductive layer and disposed at particular parts of the rotorcrafts). For example, the conductive layer may be electrically connected to the rest of the rotorcraft by using metal bonding strips to connect the conductive layer to an internal electric "ground plane," or sink to drain the electric charge.

Rather than having a separate de-icing system configured to provide electric power to heaters coupled to the blade 100, the disclosed systems and methods utilize the lightning protection system to provide electric power to the heaters. This way, fewer components are used, thereby enhancing reliability of the rotorcraft. Further, the heaters are disposed at or proximate to the outer surface of the blade 100 facilitating maintenance and reducing the amount of electric power that is sufficient to melt ice.

FIGS. 2-9 illustrate stages of integrating a de-icing heater or heating element to a lightning strike protection system of a rotorcraft, in accordance with an example implementation. The illustrations shown in FIGS. 2-9 are generally shown in cross-sectional views to illustrate sequentially formed layers developed to integrate the de-icing heater to the lightning strike protection system. The layers can be developed by microfabrication and/or manufacturing techniques such as, for example, electroplating, photolithography, deposition, and/or evaporation fabrication processes, spin coating, spray coating, roll-to-roll coating, ink jet, direct-write, among other possible techniques.

Further, in examples, the various materials of the layers may be formed according to patterns using photoresists and/or masks to pattern materials in particular arrangements. Additionally, electroplating techniques may also be employed to coat ends or edges of conductive layers with electrical contacts (e.g., metallic pads or electrical leads). For example, an arrangement of conductive material formed by a deposition and/or photolithography process can be plated with a metallic material to create a conductive electrical contact.

The dimensions, including relative thicknesses and widths, of the various layers illustrated and described in connection with FIGS. 2-9 are not illustrated to scale. Rather, the drawings in FIGS. 2-9 schematically illustrate the ordering of the various layers for purposes of explanation only.

Figure 2:
FIG. 2 illustrates a substrate, in accordance with an example implementation.

FIG. 2 illustrates a substrate 200, in accordance with an example implementation. The substrate 200 may represent the blade 100 or an outer layer of the blade 100, along the spanwise axis, for example. As mentioned above, the blade 100 is used herein as an example aerodynamic structure, and the substrate 200 can be a part of any other aerodynamic structure (e.g., airfoil or any other component) of an aircraft, rotorcraft, wind turbine, etc.

As examples, the substrate 200 can be made out of a composite structural material such as carbon fiber, fiberglass, or other composite materials. In an example, the substrate 200 may include a fiber-reinforced composite material.

The substrate 200 can be cleaned before forming or depositing other layers thereon. The substrate 200 can be cleaned in a variety of ways such as soaking in a first fluid, rinsing with a second fluid, and drying with a gas. In some examples, the first fluid can include a solvent, such as acetone. Moreover, in some examples, the second fluid can include isopropyl alcohol. Further, in some examples, the gas may include nitrogen. Rinsing may be performed in a variety ways, such as soaking in a bath in a tank, an automated spray, manually via a squirt bottle, etc.

The substrate 200 has a surface 202 that represents the outer surface of the composite material of the blade 100.

Figure 3:
FIG. 3 illustrates forming a conductive layer of a lightning strike protection system on the substrate, in accordance with an example implementation.

FIG. 3 illustrates forming a conductive layer 300 of a lightning strike protection system on the substrate 200, in accordance with an example implementation. The conductive layer 300 is configured to be electrically conductive to provide a conductive path from a location of the blade 100 where a lightning strike is most likely to impact the blade 100 to an electrically-grounded location in the rotorcraft.

The conductive layer 300 can be made of a metallic material (e.g., copper) or a mesh of a metallic material (e.g., copper or other conductive alloy mesh). In other examples, the conductive layer 300 could be made of expanded foil such as a continuous expanded aluminum foil (CEAF) comprising a perforated foil forming a mesh. Aluminum is used herein as an example, and any other metal could be used to form a continuous expanded metal foil (CEMF). In another example, the conductive layer 300 can be made or a resin material (e.g., epoxy) with a metallic material (e.g., aluminum threads or particles) dispersed therein to form a network therein. Other materials and configurations are possible. The conductive layer 300 may have a thickness of about 4-5 thousandth of an inch (i.e., 4-5 mil.).

Figure 4:
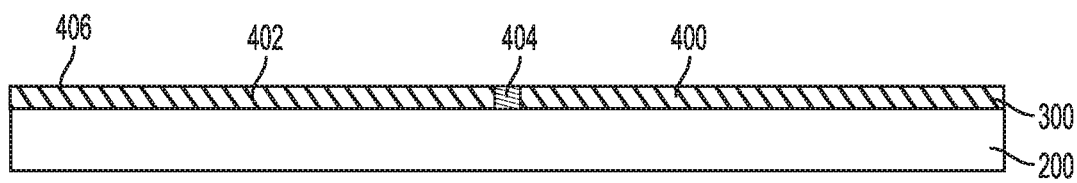
FIG. 4 illustrates the conductive layer segmented into separate electrodes, in accordance with an example implementation.

FIG. 4 illustrates the conductive layer 300 segmented into separate electrodes, in accordance with an example implementation. The conductive layer 300 can be segmented into one or more respective segments representing respective electrodes. For example, as shown in FIG. 4, the conductive layer 300 is divided into a first segment 400 and a second segment 402 separated from each other by a gap 404. The gap 404 can include a dielectric material such as air or other dielectric.

The gap 404 is configured to be sufficiently small to allow electric current from one segment (e.g., the first segment 400) to flow to the other segment (e.g., the second segment 402) through the gap 404. For example, the gap 404 may be less than 0.15 inches to segment the conductive layer 300 into respective electrodes yet allow electric current to flow from one segment to another. The electric current generated by a lightning strike overcomes the resistance of the material in the gap 404 to flow from one segment of the conductive layer 300 to the next segment. In examples, the conductive layer 300 may be segmented into more than two segments. The conductive layer 300 may have a surface 406 configured to receive an insulating layer as described next.

Figure 5:
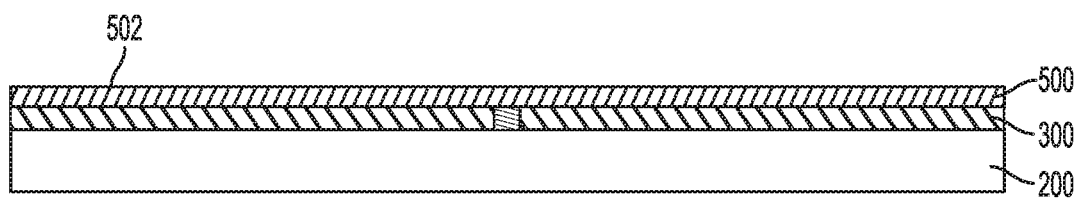
FIG. 5 illustrates an insulating layer formed on the conductive layer, in accordance with an example implementation.

FIG. 5 illustrates an insulating layer 500 formed on the conductive layer 300, in accordance with an example implementation. The insulating layer 500 can be formed, for example, of a resin material. Example resin materials include epoxy, thermoplastic resins, phenolic resins, or silicone resins, which are characterized by being durable and operable at high temperatures. It may be desirable to configure the insulating layer 500 of a thermostable resin material. In examples, the insulating layer 500 can be made of a transparent or partially-transparent material.

In an example, the insulating layer 500 can be configured as an adhesive layer that adheres to the conductive layer 300 and facilitates adhering further layers thereto as described below. The insulating layer 500 can be deposited on the conductive layer 300 in a variety of ways such as brushing, painting, patterning, printing, any additive manufacturing method, etc. In examples, after forming the insulating layer 500 on the conductive layer 300, the insulating layer 500 can be cured (e.g., cured at a particular temperature such as 70 C.). Curing can involve toughening or hardening of the insulating material by heat or chemical additives, among other processes. Curing can be partial or can be full depending on the application and implementation.

The insulating layer 500 can have a surface 502 configured to receive a resistive-heater layer as described below. To connect the resistive-heater layer to the conductive layer 300 through the insulating layer 500, the insulating layer 500 can be mechanically sanded-through at particular locations. In another example, an etch mask could be used as described next.

Figure 6:
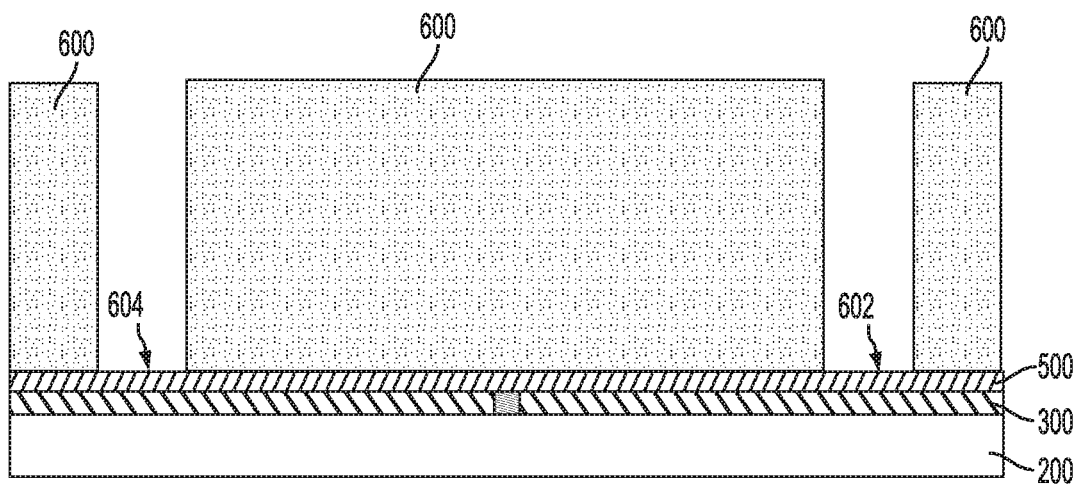
FIG. 6 illustrates an etch mask formed over a portion of the insulating layer thereby exposing portions of the insulating layer, in accordance with an example implementation.

FIG. 6 illustrates an etch mask 600 formed over a portion of the insulating layer 500 to provide exposed portions 602 and 604 of the insulating layer 500, in accordance with an example implementation. The etch mask 600 thus partially covers the insulating layer 500 to provide the exposed portions 602 and 604.

The etch mask 600 can include one or more photoresist layers, such as one photoresist layer comprising cyclopentanone. In another example, the etch mask 600 can include one or more metal layers and/or one or more nitride layers. Moreover, the etch mask 600 can be made to have can have a variety of thicknesses such as a thickness between 100 to 150 micrometers.

In an example, the etch mask 600 can be formed by spin coating and patterning. The etch mask 600 can be patterned by exposing and developing, for example. However, in other examples, the etch mask 600 can be formed by microfabrication processes such as evaporation and/or sputtering.

In examples, the insulating layer 500 can be cleaned prior to forming the etch mask 600. For example, the cleaning can involve soaking in a first fluid, rinsing in a second fluid, and drying with a gas. In some examples, the first fluid can include a solvent, such as acetone. Moreover, in some examples, the second fluid can include isopropanol (IPA). Further, in some examples, the gas can include nitrogen. Further, prior to forming the etch mask 600, the partially-fabricated blade shown in FIG. 5 may be baked. The partially-fabricated blade may, for example, be baked at a particular temperature (e.g., 90 degrees Celsius) for a time period (e.g., 5 minutes). After forming the etch mask 600, the partially-fabricated blade shown in FIG. 6 can be rinsed in a fluid, dried with a gas, and baked at a particular temperature for a time period.

Figure 7:
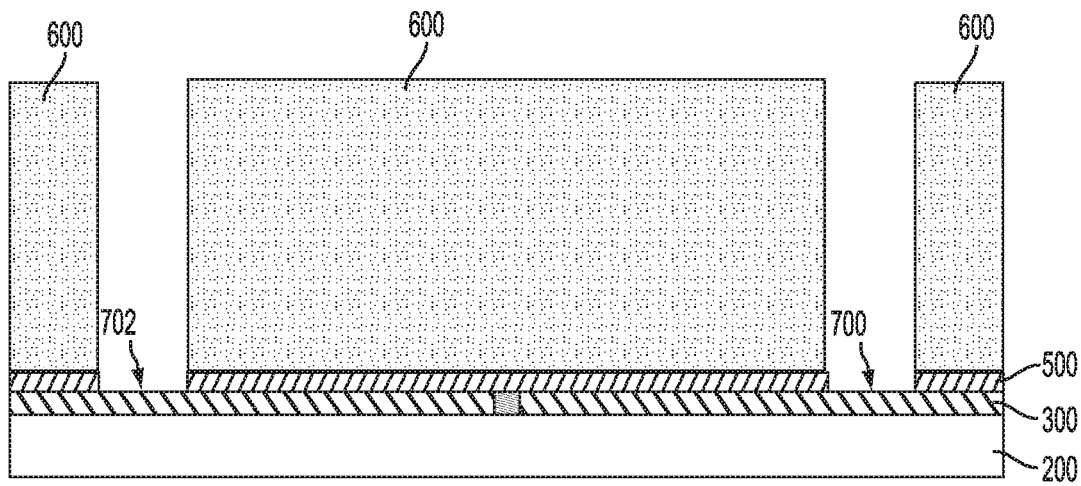
FIG. 7 illustrates the exposed portions of the insulating layer removed, in accordance with an example implementation.

FIG. 7 illustrates the exposed portions 602 and 604 of the insulating layer 500 removed, in accordance with an example implementation. As shown in FIG. 7, the exposed portions 602 and 604 of the insulating layer 500 (i.e., the portions of the insulating layer 500 that are not covered by the etch mask 600) are removed to provide a partially-fabricated blade shown in FIG. 7.

The exposed portions 602 and 604 of the insulating layer 500 are removed by etching using inductively-coupled plasma at a particular power level for a time period. In some examples, the inductively-coupled plasma may include an oxygen plasma. In an example, the etching may involve one or more cycles that include an etch period followed by a rest period, such that the partially-fabricated blade may cool down. In some examples, the one or more cycles may be applied in sequence. Other plasmas and/or types of plasmas may be used as well, such as a plasma asher, a reactive ion etcher, etc.

Removal of the exposed portions 602 and 604 of the insulating layer 500 forms gaps in the insulating layer 500 and exposes portions of the conductive layer 300. Thus, removal of the exposed portions 602 and 604 of the insulating layer 500 provides access to the conductive layer 300 by way of corresponding exposed portions 700 and 702. Although two exposed portions 602, 604 (and the corresponding exposed portions 700, 702) are illustrated in the Figures, more or fewer portions or gaps could be used. For example, the etch mask 600 could be formed to expose one portion in the insulating layer 500, and when such portion is removed, one gap is formed in the insulating layer. Other examples are possible. Regardless of the number of exposed portions or gaps, access is provided to the conductive layer 300 through the insulating layer 500.

Figure 8:
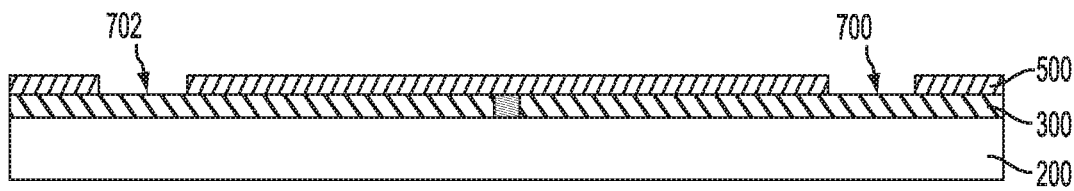
FIG. 8 illustrates the etch mask removed, in accordance to an example implementation.

FIG. 8 illustrates the etch mask 600 removed, in accordance with an example implementation. After the exposed portions 602 and 604 of the insulating layer 500 are removed, the etch mask 600 may then be removed as shown in FIG. 8. The etch mask 600 can, for example, be removed by an inductively-coupled plasma.

Figure 9:
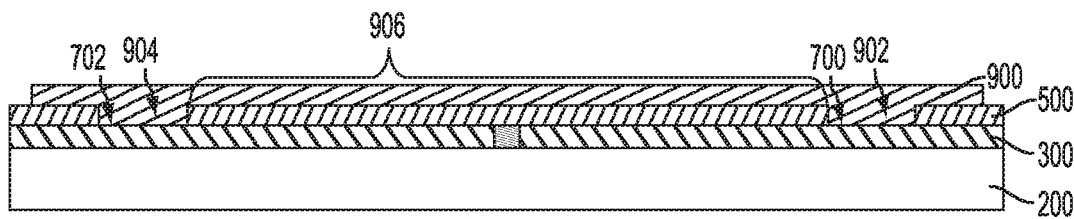
FIG. 9 illustrates a resistive-heater layer formed on the insulating layer and in contact with the exposed portions of the conductive layer, in accordance to an example implementation.

In examples, as mentioned above, rather than using the etch mask 600, gaps could be made in the insulating layer 500 (similar to removing the exposed portions 602 and 604)

in other ways such as sanding through the insulating layer 500. In another example, laser ablation could be used to remove portions of the insulating layer 500. In another example, if the insulation layer 500 is made of a thermoplastic material, it could be locally melted and then mechanically dis-bonded to create the gaps in the insulation layer 500. In another example, the insulating layer 500 could be selectively bonded to the conductive layer 300 in the first place as opposed to removing portions thereof later. For instance, the insulation layer 500 could be made of a pressure sensitive adhesive that is scored (or pre-slit) and peeled away. Alternatively, a film adhesive that is locally bonded could be used FIG. 9 illustrates a resistive-heater layer 900 formed on the insulating layer 500 and in contact with the exposed portions of the conductive layer 300, in accordance with an example implementation. The resistive-heater layer 900 is configured as the heater or heating element of the de-icing system of a rotorcraft that includes the blade 100. The term "resistive-heater" is used herein to indicate heat is generated via a Joule heating, also known as Ohmic heating), in which the passage of an electric current through the resistive-heater layer 900 produces heat. The power of heating generated by resistive-heater layer 900 is proportional to the product of its electrical resistance and the square of the electric current.

As shown in FIG. 9, as a result of the removal of the exposed portions 602 and 604 of the insulating layer 500 and exposing the corresponding exposed portions 700 and 702 of the conductive layer 300, the resistive-heater layer 900 contacts the conductive layer 300. In particular, the resistive-heater layer 900 includes a first portion 902 that fills a gap in the insulating layer 500 that has been occupied by removed material of the exposed portion 602 of insulating layer 500. The resistive-heater layer 900 also includes a second portion 904 that fills a gap in the insulating layer 500 that has been occupied by removed material of the exposed portion 604 of the insulating layer 500. The portions 902 and 904 thus reliably provide electrical contact between the resistive-heater layer 900 and the conductive layer 300 without using additional wires or cables that could be broken or disconnected during operation of the rotorcraft.

With this configuration, an electric current provided to the conductive layer 300 is communicated to the resistive-heater layer 900 causing the resistive-heater layer 900 to generate heat to melt ice on the blade 100 (which includes the substrate 200). For example, the heat may be generated in a heating zone 906 shown in FIG. 9.

The resistive-heater layer 900 is made of an electrically-conductive material. As examples, the resistive-heater layer 900 can be made of any of several conductive polymers. For instance, the resistive-heater layer 900 can be made of polyaniline (PANT), poly(ethylenedioxythiophene) (PEDOT), poly(styrenesulfonate) (PSS), dodecylbenzene sulfonic acid (DBSA), Dinonylnaphthylsulfonic acid (DNNSA), Polypyrrole (PPy), mixtures thereof, or salts thereof. In other examples, the resistive-heater layer 900 could be made of graphene paint, carbon nanotubes paint, carbon black, conductive oxides, or metallic particles.

The resistive-heater layer 900 could be made of an intrinsically conducting polymer (ICP). ICPs include synthetic organic polymers configured to conduct electricity. In other examples, the resistive-heater layer 900 could be made of an extrinsically conducting polymer. An extrinsically conducting polymer is obtained by adding specific additives (e.g., metallic particle fillers) to naturally insulating polymer to render such an insulting polymer electrically conductive.

In other examples, the resistive-heater layer 900 could be made of a mixture of intrinsically and extrinsically conducting polymers.

As a specific example for illustration, the resistive-heater layer 900 could be made of Polyaniline-Dinonylnaphthalene sulfonic acid (PANI-DNNSA). PANI is a conducting polymer of the semi-flexible rod polymer family, and is characterized by high electrical conductivity. DNNSA is an organic chemical, e.g., an aryl sulfonic acid. In examples, DNNSA has a melting point of 259.5 C., a boiling point of 600.4 C., and may have low water solubility. DNNSA may have low volatility and vapor pressure and is stable above 100 C. DNNSA can be prepared by reaction of naphthalene with nonene, yielding diisononylnaphthalene. Diisononylnaphthalene then undergoes sulfonation. DNNSA can be added to a PANI fluid to increase the electrical conductivity of the fluid. PANI-DNNSA is used herein as example; however, any other conductive polymer, such as the conductive polymers, mentioned above could be used.

In other examples, the resistive-heater layer 900 could be made of layer-by-layer stack-up having conductive polymer layers interposed between two respective protective encapsulation insulating layers. In these examples, the conductive polymer layers can be connected in parallel to a source of electric power to achieve a particular electrical resistance and generate a particular amount of heat. More conductive polymer layers connected in parallel may reduce overall electrical resistance and vice versa. Thus, a predetermined electrical resistance and a predetermined amount of heat can be generated by configuring the resistive-heater layer 900 to have a particular number of conductive polymer layers.

Figure 10:
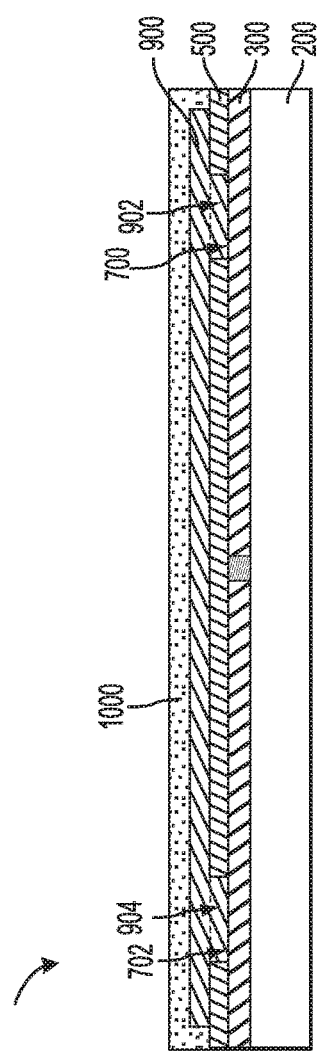
FIG. 10 illustrates a protective layer added to form a device, in accordance to an example implementation.

In some examples, an encapsulation layer or encapsulation package can be added to protect the resistive-heater layer 900 and other layers of the blade 100 from the environment. FIG. 10 illustrates a protective layer 1000 added to form a device 1002, in accordance with an example implementation. The protective layer 1000 (or protective package) can be formed about the blade 100 to protect the various layers (e.g., the substrate 200, the conductive layer 300, the insulating layer 500, and the resistive-heater layer 900) from an environment of the rotorcraft (e.g., protection against sand, rain, erosion, corrosion, etc.). In an example, the protective layer 1000 can be configured as a conformal insulating coating of polyurethane, polyimide, polyester, or epoxy that is applied to a surface of stack of layers shown in FIG. 9 by spray, dip coating, screen printing, etc. The protective layer 1000 can then be cured via ultraviolet light or can be thermally cured. In another example, the protective layer 1000 can comprise a polymer film (e.g., polyurethane, polyimide, polyester, etc.) that is to a surface of the of stack of layers shown in FIG. 9 using a pressure sensitive adhesive that bonds to the surface of the of stack of layers. These examples are for illustration only and other materials and configuration are possible for the protective layer 1000.

The device 1002 provides several enhancements. Rather than having separate heating elements disposed within the blade 100 during manufacturing of the blade 100, the heating element (i.e., the resistive-heater layer 900) can be applied as a coating material after the composite material of the blade 100 is formed. As such, the resistive-heater layer 900 might not place limitations on the manufacturing processes performed to make the composite material (e.g., limitations on curing temperature levels or types of materials to be used for the resistive-heater layer 900). Also, the resistive-heater layer 900 can be added to blades of legacy rotorcraft that are not configured with a de-icing system to retrofit such rotorcraft with de-icing capability.

Also, the de-icing system is integrated with the lightning protection system. In particular, a rotorcraft, aircraft, wind turbine, etc. can be configured to have the conductive layer 300 to facilitate guiding or conducting electric current generated by a lightning strike at one location of the blade to an electrically-grounded location within the rotorcraft. Thus, the rotorcraft includes wiring and cables that electrically connect the conductive layer 300 to the electrically-grounded location. An electric power source, e.g., alternating current (AC) source, may be connected to the same wiring and cables so as to enable providing the conductive layer 300 with an AC electric current, for example.

The electric current is then communicated to the resistive-heater layer 900 through the portions 902 and 904, which are in contact with the conductive layer 300. Due to the electrical resistance of the resistive-heater layer 900, the resistive-heater layer 900 is heated. As such, electric power from the power source is dissipated as thermal power from the resistive-heater layer 900, thereby causing ice on the blade 100 to melt. With this configuration, the de-icing system is integrated with the lightning protection system (e.g., the conductive layer 300 and associated wiring and cables). This configuration may reduce the cost of the rotorcraft because both systems use common wiring and components, rather than having separating wiring and components for each system.

Further, with the configuration of the device 1002, the resistive-heater layer 900 is disposed near or at the outer surface of the blade 100 because the surface 202 of the substrate may comprise the outer surface of the composite material of the blade 100. For instance, the thermal energy generated by the resistive-heater layer 900 traverses one layer, i.e., the protective layer 1000, to affect any ice formed over the blade 100. As such, the amount of electric energy used to generate sufficient heat to melt the ice is reduced compared to other systems where the heaters are disposed deep within the blade 100. It is estimated that the reduction in power could amount to about 30%-50% of the electrical power used in conventional de-icing system. Such reduction in electrical power requirement may enable placing de-icing systems on lighter rotorcraft and aircraft that might not be capable of generating the amount of electrical power that drives conventional de-icing systems.

Moreover, due to the resistive-heater layer 900 being disposed near or at the outer surface of the blade 100 (e.g., between 0.1 millimeter and 5 millimeter from the outer surface), the resistive-heater layer 900 is accessible. In the example implementation of FIG. 10, the resistive-heater layer 900 is one layer away from the outer surface (e.g., outer surface of the protective layer 1000) of the blade 100. In other words, the protective layer 1000 is what separates the resistive-heater layer 900 from the outer surface. Thus, with this configuration, performing maintenance and repair operations is facilitated. If a malfunction of the resistive-heater layer 900 occurs, the protective layer 1000 or a portion thereof is removed to gain access to and repair or maintain the resistive-heater layer 900. Another protective layer 1000 can then be added to restore the blade 100. Thus, the configuration of FIG. 10 contrasts with conventional de-icing systems where the heaters are disposed deep within the blade, such that when a malfunction occurs in such conventional systems, no maintenance can be performed and the overall blade de-icing system is rendered irreparable.

Figure 11:
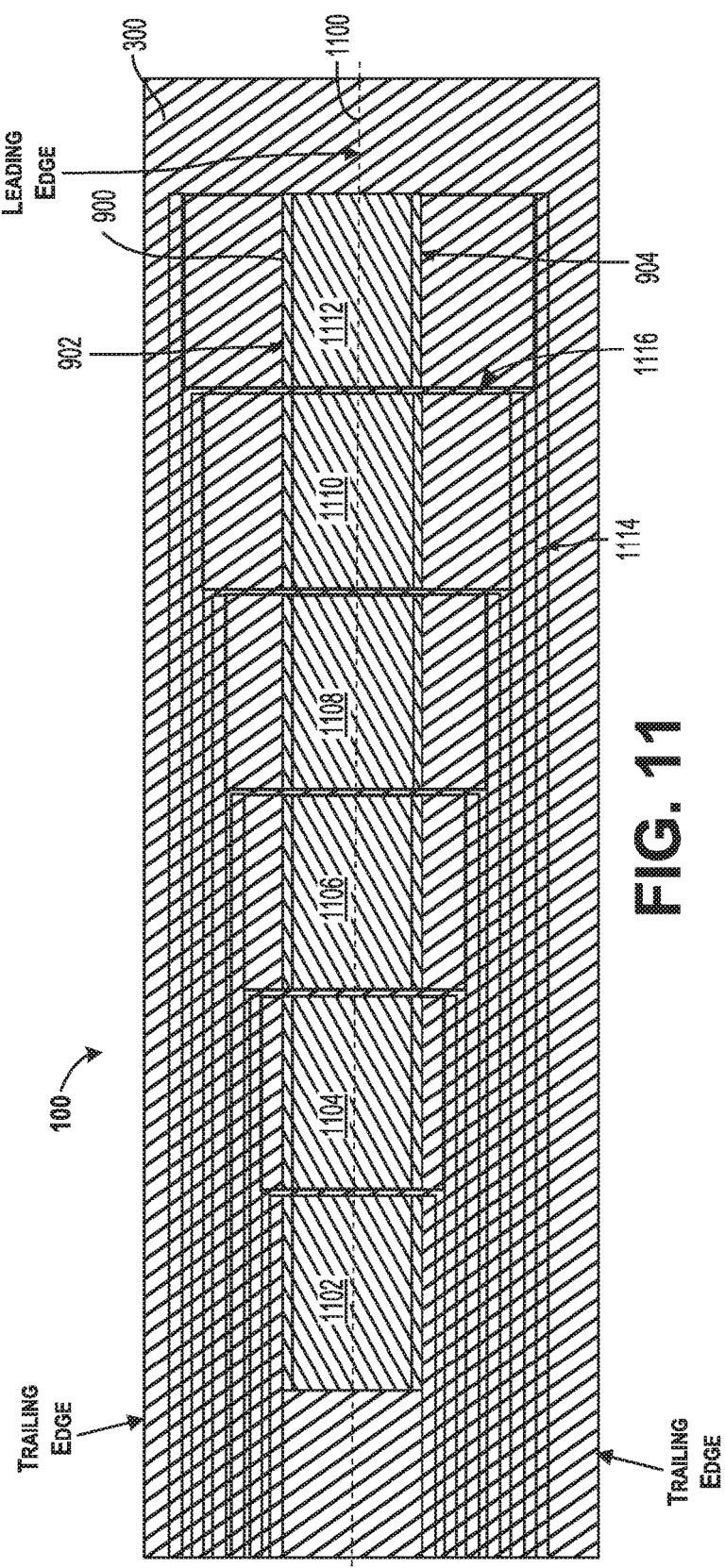
FIG. 11 illustrates the blade unfolded to show the various components of the configuration in FIG. 10, in accordance to an example implementation.

FIG. 11 illustrates the blade 100 unfolded to show the various components of the configuration in FIG. 10, in accordance with an example implementation. In FIG. 11, the blade 100 is unfolded such that the leading edge (see FIG. 1) is at dashed line 1100 shown at the center of FIG. 11. Also, due to the blade 100 being depicted in an unfolded configuration in FIG. 11, the substrate 200 is not shown as the substrate 200 is covered by the conductive layer 300.

The gap 404, which in examples segments or divides the conductive layer 300 as described above with respect to FIG. 4, is also disposed along the line 1100. Further, in the configuration of FIG. 11, the insulating layer 500 is transparent and is thus not distinguishable in FIG. 11. In other words, the insulating layer 500 is mounted on the conductive layer 300, but the insulating layer 500 is transparent such that the conductive layer 300 is shown through the insulating layer 500. Further, to distinguish the portions 902 and 904 where the resistive-heater layer 900 contacts the conductive layer 300, the portions 902 and 904 are cross-hatched with a different fill pattern relative to the rest of the resistive-heater layer 900. The protective layer 1000 is not shown in FIG. 11.

As depicted in FIG. 11, the resistive-heater layer 900 may be disposed along the leading edge of the blade 100, but might not be extended all the way to the trailing edge of the blade 100. In other words, in examples, the resistive-heater layer 900 may cover a frontal or leading portion of the blade 100 to melt ice formed thereon or preclude ice from forming thereon.

As mentioned above, the de-icing system includes a power generator or source to apply electrical energy to the resistive-heater layer 900 through the conductive layer 300. In examples, power densities of about 25 Watts per square inch (WSI) may achieve sufficient surface temperatures with minimum power-on times. Such power densities may, however, place a large demand on the electrical system of the rotorcraft. In order to reduce the peak power demand, the resistive-heater layer 900 may be divided into heating zones. These zones are fired in a specific sequence to de-ice the blade 100, and this sequence can be tailored to icing conditions.

As an example implementation, as shown in FIG. 11, the resistive-heater layer 900 can be divided into 6 heating zones 1102, 1104, 1106, 1108, 1110, and 1112. Six heating zones are used herein as an example for illustration only. More or fewer heating zones could be implemented.

Because the resistive-heater layer 900, and thus the heating zones 1102-1112, are disposed at or proximate to the outer surface of the blade 100, the heating zones 1102-1112 can be configured to generate less amount of heat compared to conventional configurations where heating elements are disposed deep within the blade 100 away from the surface. In particular, because the resistive-heater layer 900 is disposed near the outer surface, less heat is wasted or dissipated before reaching the surface, whereas with conventional configurations heat could be dissipated and wasted before reaching the outer surface. In other words, disposing the resistive-heater layer 900 proximate to the outer surface renders the de-ice system more energy efficient. As a result, the heating zones 1102-1112 can have smaller dimensions compared to zones of conventional de-icing systems. The heating zones 1102-1112 may be disposed chordwise, spanwise, or a combination of both on the blade 100.

To provide electric power separately to each of the heating zones 1102-1112, individual isolated leads or lines can be cut through the conductive layer 300, each line connecting power to a particular heating zone. For instance, as shown in FIG. 11, lines 1114 and 1116 can be cut in the conductive layer 300 to provide electric power to the heating zone 1112 independent from the other heating zones 1102-1110. Similarly, each of the other heating zones 1102-1110 may have corresponding lines configured to provide electric power independently to each heating zone as depicted in FIG. 11.

In addition, or alternative, to dividing the resistive-heater layer 900 into independently-activated heating zones, the resistive-heater layer 900 may be configured to cause different amounts of heat to be generated at different zones. Different amounts of heat can be generated at different zones by configuring the different zones of the resistive-heater layer 900 to have different electrical resistances.

For instance, in the example mentioned above where the resistive-heater layer 900 could comprise multiple conductive polymer layers interposed between respective insulating layers, a different number of layers can be used at different zones. Having more conductive polymer layers (connected in parallel to the power source) at one zone may indicate that the electrical resistance at that zone may be lower than a respective electrical resistance at a different zone having fewer conductive polymer layers. As a result of using different number of layers at different zones, a heating gradient may be generated across the blade 100. Such arrangement can be implemented by patterning (e.g., printing) a different number of layers at various zones to enable some locations to be hotter than others.

In another example, the same number of layers can be used across the zones; however, different conductive polymer materials having different electrical conductivities can be used at different zones. As a result, different electrical resistance can be generated at different zones and a heating gradient may be generated across the blade 100.

Additionally or alternatively, the conductive polymer layers at one zone may be treated by a conductivity enhancer while conductive polymer layers at another zone might not be treated with, or may be treated with a different, conductivity enhancer. An example conductivity enhancer may include a morphology enhancer such as IPA. Another example conductivity enhancer may include a band modifier to enhance electron hole mobility of a conductive polymer layer.

Additionally or alternatively, a thickness of the resistive-heater layer 900 at one zone may be different than a respective thickness of the resistive-heater layer 900 at another zone. The different thickness may indicate different electrical conductivity and different electrical resistances at different zones. Thus, several techniques can be used to modify the conductivity and resistivity over the substrate 200 (and thus over the blade 100) and generate different amounts of heat at different zones of the resistive-heater layer 900.

Although the description above is provided in the context of a de-icing system, the configurations described above could also be used for an anti-icing system. In an anti-icing system, the above described configuration can be used to preclude ice from forming in the first place on a substrate.

Figure 12:
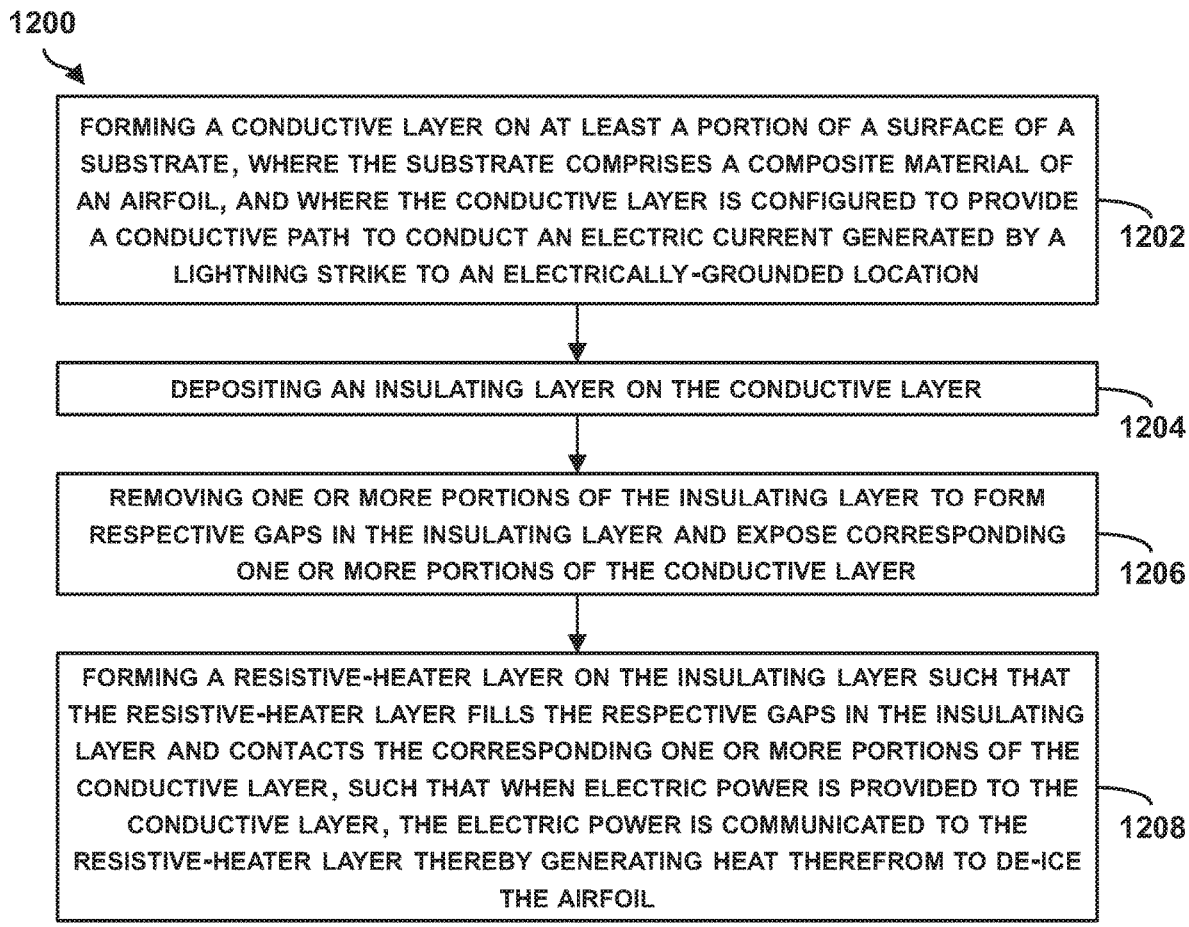
FIG. 12 is a flowchart of a method for forming an aerodynamic structure, in accordance with an example implementation.

FIG. 12 is a flowchart of a method 1200 for forming an aerodynamic structure, in accordance with an example implementation. The method 1200 presents an example of a method that could be used to form an aerodynamic structure (e.g., the blade 100) or the device 1002, for example. The method 1200 may include one or more operations, functions, or actions as illustrated by one or more of blocks 1202-1226. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art At block 1202, the method 1200 includes forming the conductive layer 300 on at least a portion of a surface of the substrate 200. The substrate 200 comprises a composite material of an aerodynamic structure (e.g., the blade 100). The conductive layer 300 is configured to provide a conductive path to conduct an electric current generated by a lightning strike to an electrically-grounded location. Forming the conductive layer may include forming a CEMF layer. Forming the CEMF layer may include forming the CEMF layer to include aluminum or copper.

At block 1204, the method 1200 includes depositing the insulating layer 500 on the conductive layer 300. In an example, depositing the insulating layer 500 may include depositing an adhesive layer comprising a resin including polyurethane, epoxy, thermoplastic, phenolic, silicone material, etc., which is characterized by being durable and operable at high temperatures.

At block 1206, the method 1200 includes removing the exposed portions 602 and 604 of the insulating layer 500 to form respective gaps in the insulating layer 500 and the corresponding exposed portions 700 and 702 of the conductive layer 300.

At block 1208, the method 1200 includes forming the resistive-heater layer 900 on the insulating layer 500 such that the resistive-heater layer 900 fills the respective gaps in the insulating layer 500 and contacts the portions 700 and 702 of the conductive layer 300, such that when electric power is provided to the conductive layer 300, the electric power is communicated to the resistive-heater layer 900 thereby generating heat therefrom to de-ice the aerodynamic structure (e.g., the blade 100).

Figure 13:
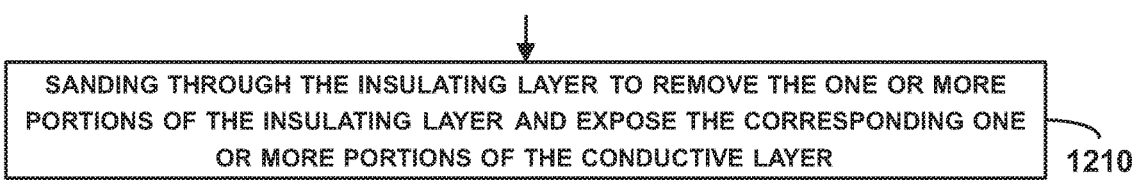
FIG. 13 is a flowchart of additional operations that may be performed with the method of FIG. 12, in accordance with an example implementation.

FIG. 13 is a flowchart of additional operations that can be executed and performed with the method 1200, in accordance with an example implementation. At block 1210, operations include sanding through the insulating layer 500 to remove the exposed portions 602 and 604 of the insulating layer 500 and expose the portions 700 and 702 of the conductive layer 300.

Figure 14:
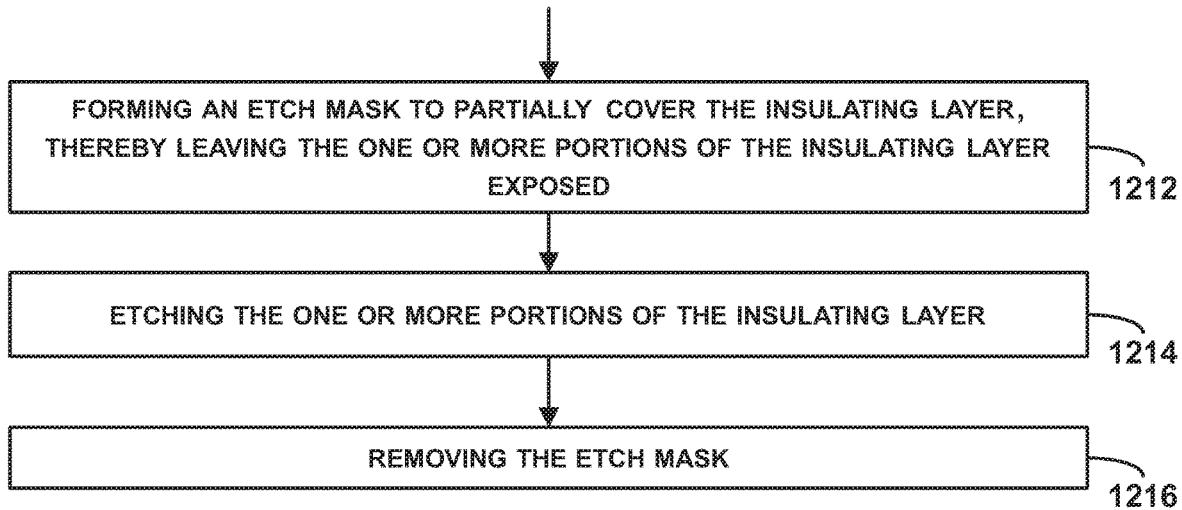
FIG. 14 is a flowchart of additional operations that may be performed with the method of FIG. 12, in accordance with an example implementation.

FIG. 14 is a flowchart of additional operations that can be executed and performed with the method 1200, in accordance with an example implementation. At block 1212, operations include forming the etch mask 600 to partially cover the insulating layer 500, thereby leaving the exposed portions 602 and 604 of the insulating layer exposed. At block 1214, operations include etching the exposed portions 602 and 604 of the insulating layer 500. At block 1216, operations include removing the etch mask 600.

Figure 15:
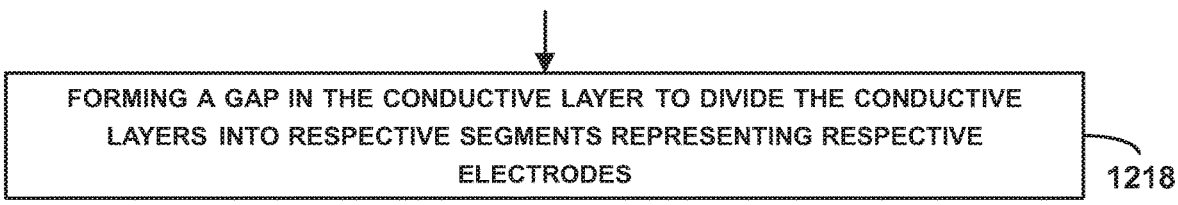
FIG. 15 is a flowchart of additional operations that may be performed with the method of FIG. 12, in accordance with an example implementation.

FIG. 15 is a flowchart of additional operations that can be executed and performed with the method 1200, in accordance with an example implementation. At block 1218, operations include forming the gap 404 in the conductive layer 300 to divide the conductive layer 300 into the segments 400 and 402 representing respective electrodes.

Figure 16:
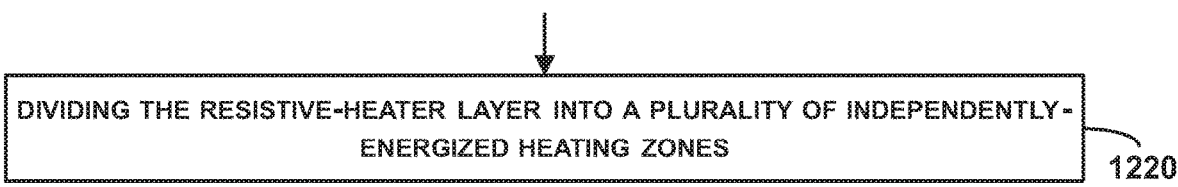
FIG. 16 is a flowchart of additional operations that may be performed with the method of FIG. 12, in accordance with an example implementation.

FIG. 16 is a flowchart of additional operations that may be executed and performed with the method 1200, in accordance with an example implementation. At block 1220, operations include dividing the resistive-heater layer 900 into a plurality of independently-energized heating zones (e.g., the heating zones 1102-1112).

Figure 17:
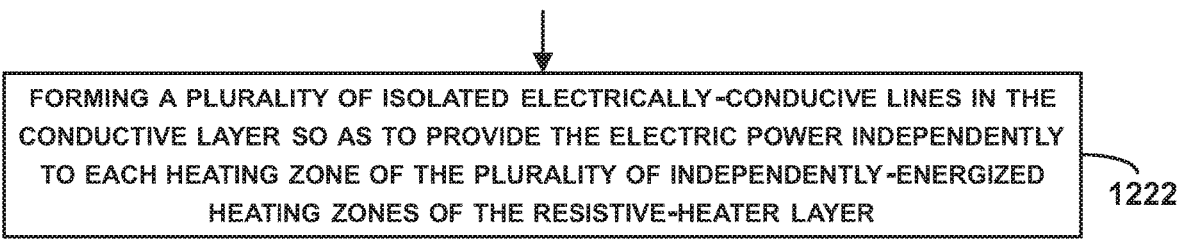
FIG. 17 is a flowchart of additional operations that may be performed with the method of FIG. 12, in accordance with an example implementation.

FIG. 17 is a flowchart of additional operations that can be executed and performed with the method 1200, in accordance with an example implementation. At block 1222, operations include forming a plurality of isolated electrically-conducive lines (e.g., lines 1114 and 1116) in the conductive layer 300 so as to provide the electric power independently to each heating zone of the plurality of independently-energized heating zones 11102-1112 of the resistive-heater layer 900.

FIG. 18 is a flowchart of additional operations that can be executed and performed with the method 1200, in accordance with an example implementation. At block 1224, the operation of forming the resistive-heater layer includes forming at least one conductive polymer layer. Forming the at least one conductive polymer layer may include forming a layer of PANI-DNNSA, poly(ethylenedioxythiophene)-poly(styrenesulfonate) (PEDOT-PSS), Polyaniline-dodecylbenzene sulfonic acid (PANI-DBSA), polypyrrole, graphene paint, carbon nanotubes paint, carbon black, conductive oxide, or metallic particles FIG. 19 is a flowchart of additional operations that can be executed and performed with the method 1200, in accordance with an example implementation. At block 1226, the operation of forming the resistive-heater layer includes forming a multilayer stack comprising a plurality of conductive polymer layers, each conductive polymer layer being interposed between respective insulating layers. Each conductive polymer layer has a respective electrical resistance, such that when the respective conductive polymer layers are connected in parallel to a power source of the electric power, a resultant electrical resistance of the respective conductive polymer layers is less than each respective electrical resistance.

In an example, forming the multilayer stack can include forming the multilayer stack to modify electrical resistivity over the substrate 200 when the conductive polymer layers are connected in parallel to the power source. In an example, forming the multilayer stack to modify the electrical resistivity over the substrate 200 may include depositing a different number of layers at different zones of the substrate 200.

Additionally or alternatively, forming the multilayer stack to modify the electrical resistivity over the substrate 200 may include depositing conductive polymer layers having a different conductive polymer at different zones of the substrate 200. In another example, forming the multilayer stack to modify the electrical resistivity over the substrate 200 may include depositing conductive polymer layers having different thicknesses at different zones of the substrate 200.

Figure 20:
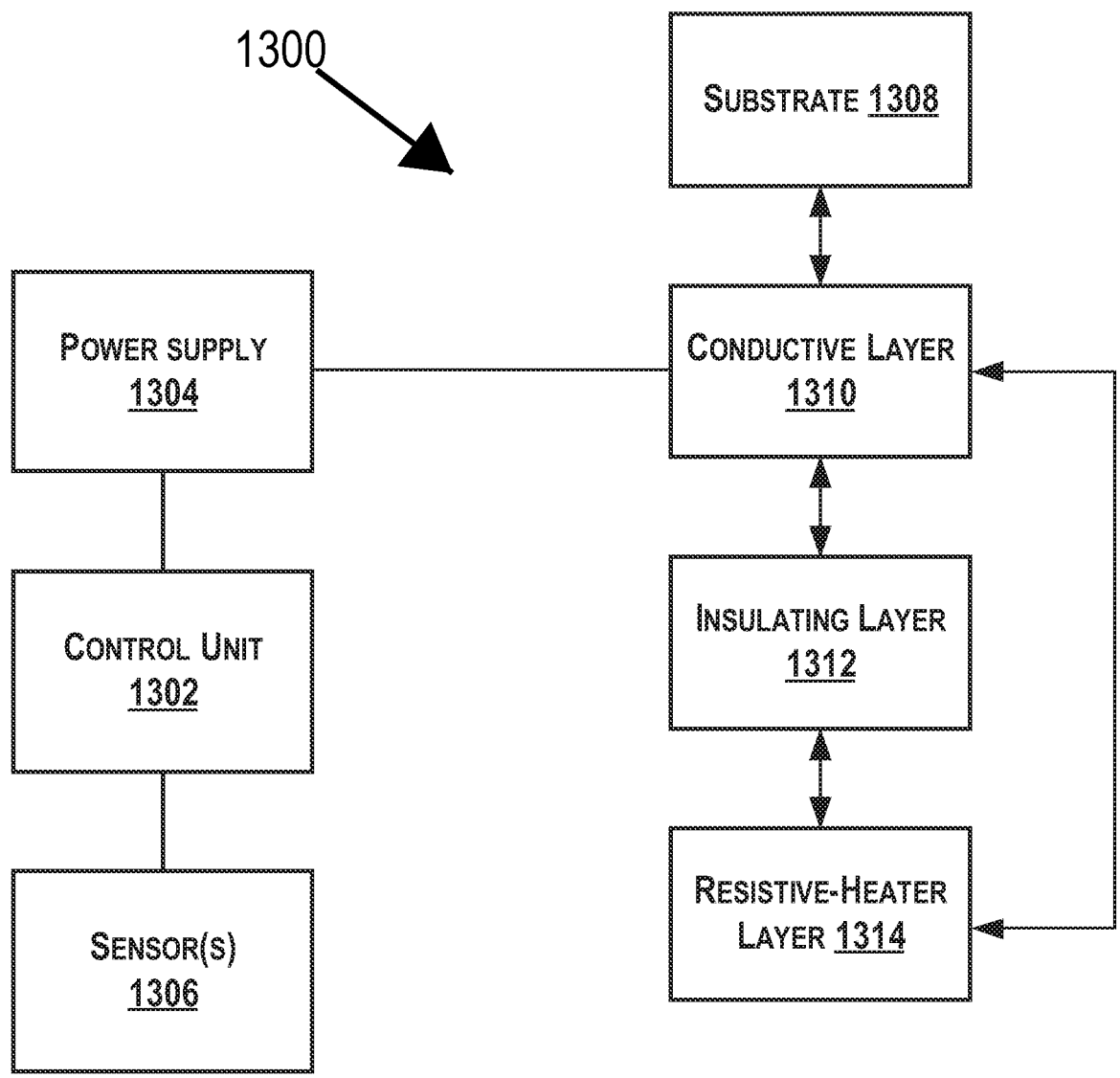
FIG. 20 illustrates a block diagram of a system, in accordance with an example implementation.

FIG. 20 illustrates a block diagram of a system 1300, in accordance with an example implementation. The system 1300 includes a control unit 1302 coupled to a power supply 1304 and sensor(s) 1306. The system 1300 may include a plurality of layers formed on an aerodynamic structure or component of the system 1300. The component can be an airfoil, for example, or any other component of an apparatus, device, machine, or craft (e.g., aircraft, rotorcraft, wind turbine, etc.).

The component may have a substrate 1308. The substrate 1308 may represent the component or an outer layer thereof. The substrate 200 can be an example of the substrate 1308. The plurality of layers also includes a conductive layer 1310 formed on or coupled to the substrate 1308. The conductive layer 1310 is configured to be electrically conductive, and the conductive layer 300 can be an example of the conductive layer 1310.

The plurality of layers further includes a resistive-heater layer 1314. The resistive-heater layer 1314 is formed on or coupled to the insulating layer 1312. The resistive-heater layer 1314 is also electrically-coupled to the conductive layer 1310.

The control unit 1302 can be configured to operate heater systems for the aerodynamic structure or component, and to provide electric power from the power supply 1304 to the conductive layer 1310 to do so. The resistive-heater layer 1314 is electrically-coupled to the conductive layer 1310, and therefore electric power provided to the conductive layer 1310 is also provided to the resistive-heater layer 1314. The resistive-heater layer 1314 then generates heat energy to preclude formation of ice on the component or melt ice that formed thereon.

The control unit 1302 can receive outputs from the sensors 1306 to determine when to initiate operation of the heater systems. As an example, the sensors 1306 can include temperature sensors to detect ambient air temperature, or water content sensors to detect an amount of water content in the air or on the component. The sensors 1306 may more generally include sensors for determining icing conditions of an environment of the component.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A system comprising:
a power supply;
a control unit coupled to the power supply;
an aerodynamic structure having a substrate comprising a composite material;
a conductive layer formed on at least a portion of a surface of the substrate, wherein the conductive layer is electrically-coupled to the power supply;
an insulating layer deposited on the conductive layer, wherein the insulating layer includes at least one gap that exposes a portion of the conductive layer; and
a resistive-heater layer formed on the insulating layer such that the resistive-heater layer fills the at least one gap in the insulating layer and contacts the portion of the conductive layer, wherein the control unit is configured to provide electric power from the power supply through the conductive layer to the resistive-heater layer, thereby generating heat therefrom.

2. The system of claim 1, wherein the conductive layer comprises a gap that divides the conductive layer into respective segments representing respective electrodes.

3. The system of claim 1, wherein the conductive layer comprises continuous expanded metal foil (CEMF).

4. The system of claim 3, wherein the CEMF comprises aluminum or copper.

5. The system of claim 1, wherein the resistive-heater layer is divided into a plurality of independently-energized heating zones.

6. The system of claim 5, further comprising:
a plurality of isolated electrically-conducive lines formed in the conductive layer and configured to provide the electric power independently to each heating zone of the plurality of independently-energized heating zones of the resistive-heater layer.

7. The system of claim 1, wherein the resistive-heater layer comprises at least one conductive polymer layer.

8. The system of claim 7, wherein the at least one conductive polymer layer comprises Polyaniline-Dinonylnaphthalene sulfonic acid (PANI-DNNSA), poly(ethylenedioxythiophene)-poly(styrenesulfonate) (PEDOT-PSS), Polyaniline-dodecylbenzene sulfonic acid (PANI-DBSA), polypyrrole, graphene paint, carbon nanotubes paint, carbon black, conductive oxide, or metallic particles.

9. The system of claim 1, wherein the resistive-heater layer comprises a multilayer stack comprising a plurality of conductive polymer layers, each conductive polymer layer being interposed between respective insulating layers, wherein each conductive polymer layer has a respective electrical resistance, such that when respective conductive polymer layers are connected in parallel to the power supply, a resultant electrical resistance of the respective conductive polymer layers is less than each respective electrical resistance.

10. The system of claim 1, further comprising:
one or more sensors configured to provide an output indicative of icing conditions of an environment of the aerodynamic structure to the control unit, wherein the control unit is configured to provide the electric power to the resistive-heater layer based on the output of the one or more sensors.

11. A vehicle comprising:
a power supply;
an aerodynamic structure having a substrate comprising a composite material;
a conductive layer formed on at least a portion of a surface of the substrate, wherein the conductive layer is electrically-coupled to the power supply;
an insulating layer deposited on the conductive layer, wherein the insulating layer includes at least one gap that exposes a portion of the conductive layer; and
a resistive-heater layer formed on the insulating layer such that the resistive-heater layer fills the at least one gap in the insulating layer and contacts the portion of the conductive layer, wherein as electric power is provided to the conductive layer from the power supply, the electric power is communicated to the resistive-heater layer, thereby generating heat therefrom to de-ice the aerodynamic structure.

12. The vehicle of claim 11, further comprising:
a control unit configured to provide the electric power from the power supply through the conductive layer to the resistive-heater layer.

13. The vehicle of claim 12, further comprising:
one or more sensors configured to provide an output indicative of icing conditions of an environment of the aerodynamic structure to the control unit, wherein the control unit is configured to provide the electric power to the resistive-heater layer based on the output of the one or more sensors.

14. The vehicle of claim 11, wherein the resistive-heater layer is divided into a plurality of independently-energized heating zones, and wherein the conductive layer includes a plurality of isolated electrically-conducive lines so as to provide the electric power independently to each heating zone of the plurality of independently-energized heating zones of the resistive-heater layer.

15. The vehicle of claim 11, wherein the vehicle is an aircraft and the aerodynamic structure is a wing of the aircraft, or the vehicle is a rotorcraft and the aerodynamic structure is a blade of the rotorcraft.

16. A blade of a rotor, the blade comprising:
a substrate comprising a composite material;
a conductive layer formed on at least a portion of a surface of the substrate;
an insulating layer deposited on the conductive layer, wherein the insulating layer includes at least one gap that exposes a portion of the conductive layer; and
a resistive-heater layer formed on the insulating layer such that the resistive-heater layer fills the at least one gap in the insulating layer and contacts the portion of the conductive layer, wherein the conductive layer is configured to receive electric power and communicate the electric power to the resistive-heater layer, thereby generating heat therefrom to de-ice the blade.

17. The blade of claim 16, wherein the resistive-heater layer is divided into a plurality of independently-energized heating zones.

18. The blade of claim 17, wherein the conductive layer includes a plurality of isolated electrically-conducive lines configured to provide electric power independently to each heating zone of the plurality of independently-energized heating zones of the resistive-heater layer.

19. The blade of claim 16, wherein the conductive layer comprises a gap that divides the conductive layer into respective segments representing respective electrodes.

20. The blade of claim 16, wherein the resistive-heater layer comprises at least one conductive polymer layer.

* * * * *